T. G. KNIGHT.
Stench and other Trap.

No. 221,073.    Patented Oct. 28, 1879.

Attest:
J. Henry Kaiser.
J. A. Rutherford

Inventor:
Thomas G. Knight,
By James L. Norris.
Atty.

UNITED STATES PATENT OFFICE.

THOMAS G. KNIGHT, OF BROOKLYN, NEW YORK.

IMPROVEMENT IN STENCH AND OTHER TRAPS.

Specification forming part of Letters Patent No. 221,073, dated October 28, 1879; application filed September 29, 1879.

*To all whom it may concern:*

Be it known that I, THOMAS G. KNIGHT, of Brooklyn, in the county of Kings and State of New York, have invented certain new and useful Improvements in Stench, Sewer, and Other Traps, of which the following is a specification.

This invention relates to certain improvements in stench, sewer, and other traps; and it has for its object to prevent the back-flow of water through the trap and the inlet, as well as the siphonage of the water through the outlet-pipe, whereby the trap is always in perfect condition to intercept the passage of gases and vapors from the main into dwellings and other places.

In the traps of ordinary construction, when a partial vacuum is created in the waste or outlet pipe the water forming the seal is at once forced out of the pipe by the pressure of the atmosphere from above the seal, breaking the seal and leaving an unobstructed passage for noxious gases and vapors from the sewer through the pipe; and when the outlet or drain pipe becomes choked from heavy rains or other causes, or when the waste-pipe of the house becomes choked, and a force-pump is applied, as usual, to clear the obstruction, water is forced backward into the building, apartment, or other place, flooding the same, the water generally carrying with it sewage-matter, which is noxious and unhealthy.

By my improvement the above objections are entirely obviated, and a trap is formed which will not only prevent the backwater, but will prevent siphonage also.

To this end the invention consists in the combination, with a stench, sewer, or other trap, of a valve-chamber provided with inlet and outlet pipes, and containing a loose float-valve, which will be automatically operated to close either the inlet or outlet pipes, as circumstances may require, to prevent the backwater or to prevent the siphonage of the trap.

Figure 1:
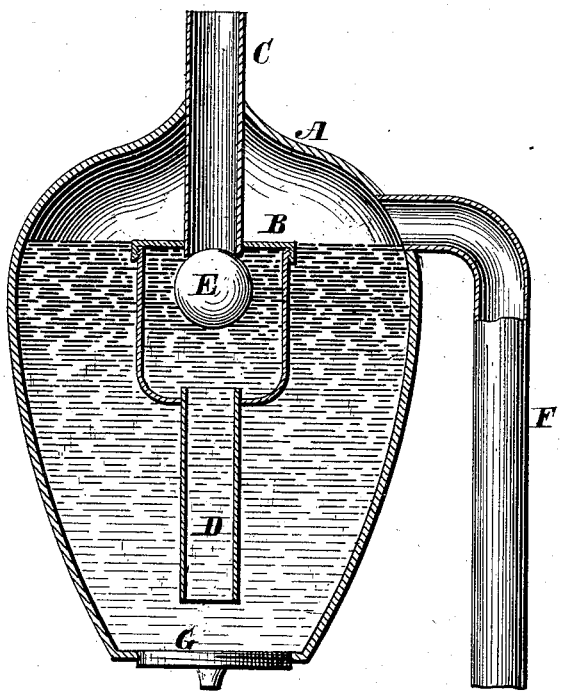
Figure 2:
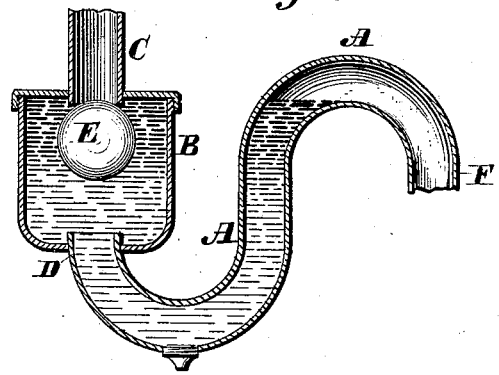

In the drawings, Figure 1 represents a sectional view of my improved trap, showing the valve-chamber and valve located therein, and Fig. 2 represents a modification of my invention, showing the valve-chamber and valve connected with an ordinary trap.

The letter A indicates a trap forming an ordinary water-seal between the inlet and waste pipes. B indicates a valve-chamber, and C the inlet-pipe leading into the upper part thereof. D indicates an outlet-pipe communicating with the trap, and E a float-valve located in the valve-chamber. The inlet and outlet pipes extend slightly into the valve-chamber, forming seats for the valve, which may be flat, as shown, or flaring, if desired.

The valve is preferably spherical, but may be of other convenient shape, in which case the valve-seats are made to correspond.

As shown in Fig. 1, the trap consists of a chamber, which may be of any suitable shape, and the valve-chamber is inclosed in it, the outlet of said valve-chamber opening into said trap near its lower end, a removable cover being secured to said lower end of the trap, by means of which solid collections may be removed. The letter F indicates the waste-pipe leading from the upper part of the trap to the sewer.

In Fig. 2 an ordinary curved trap is employed, said trap in this case forming a continuation of the outlet of the valve-chamber.

The valve-chamber is formed in two parts, secured by screw-threads, brazing, soldering, or otherwise, by means of which the valve can be placed in the valve-chamber, a plug, G, being arranged in the opening in the trap-chamber, Fig. 1, of sufficient size to permit of the valve-chamber being inserted through said opening and secured to the inlet-tube.

As above described and illustrated, the valve-chamber is of a diameter greater than the inlet and outlet pipes; but it is evident that the valve-chamber may be formed inside of a tube by providing suitable seats therein, the upper end of the tube serving as the inlet and the lower end the outlet of the valve-chamber.

The operation of my invention will be readily understood from the above description.

The normal position of the valve, owing to its buoyancy and to the fact that it is always immersed in water, is in the upper part of the valve-chamber. The pressure thus caused is not sufficient to prevent the entrance of water from the inlet-pipe into the valve-chamber; but it is evident that back-pressure from any cause will force the said valve closely to the seat of the inlet-pipe, and prevent the escape of water through said inlet. When any vacuum is caused in the waste-pipe, which would tend to draw off the water from the trap, the valve will be forced to its seat on the outlet-pipe, thus preventing the escape of water, and leaving the seal in the trap unbroken.

What I claim is—

In combination with a stench, sewer, or other trap, a valve-chamber provided with an inlet and outlet pipe, and containing a float-valve, located and arranged for closing the inlet and outlet pipes, whereby backwater, as well as siphonage, is prevented, substantially as specified.

In testimony that I claim the foregoing I have hereunto set my hand in the presence of the subscribing witnesses.

THOMAS G. KNIGHT.

Witnesses:
JAMES L. NORRIS,
JAMES A. RUTHERFORD.